Patented May 15, 1923.

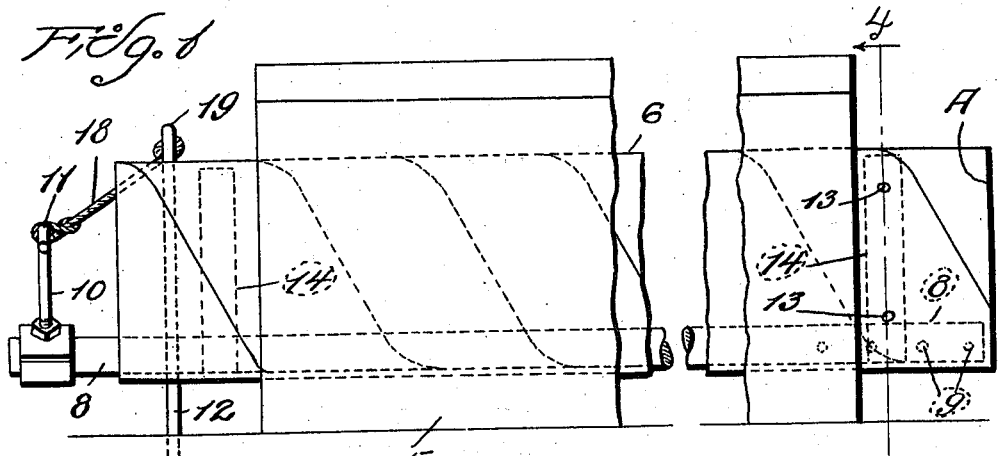

1,455,039

UNITED STATES PATENT OFFICE.

GEORGE A. BONELLI, OF KINGMAN, ARIZONA.

METHOD OF MOLDING PLASTIC STRUCTURES AND APPARATUS FOR USE IN SAME.

Application filed September 12, 1921. Serial No. 500,091.

*To all whom it may concern:*

Be it known that I, GEORGE A. BONELLI, a citizen of the United States, residing at Kingman, in the county of Mohave and State of Arizona, have invented certain new and useful Improvements in Methods of Molding Plastic Structures and Apparatus for Use in Same, of which the following is a specification, reference being had therein to the accompanying drawing.

My invention relates to an improved method of molding plastic structures and apparatus for use in practising said method, and has for its object to provide a method of establishing an inner core of resilient material at a desired diameter, holding said core at said diameter during the flowing and setting of a plastic mass around the same, and contracting said core to permit its withdrawal from the set plastic structure. The apparatus therefor comprises a tubular spirally wound resilient core, normally of larger or smaller diameter than that of the cavity to be molded, means for distending or contracting that core to a diameter desired for molding, temporarily locking said core at said diameter during the period of its use as a core, and means for contracting the diameter of said core to permit its withdrawal from the set plastic mass. The said core is capable of repeated use for an indefinite period, and its component parts are readily removed and replaced when desired.

Drawings.

Fig. 1 is a side elevation of an apparatus embodying my invention. Fig. 2 is a front elevation of the same. Fig. 3 is a plan view of the head employed in said apparatus. Fig. 4 is a sectional view of the core with said head in place, taken on the line 4—4 of Fig. 1.

Description.

The outer form 5 is of usual construction, and is spaced from the core 6 by the coiled annular spacing member 7. That core 6 is a spirally-wound sheet as illustrated, whose rear end or edge A is fastened to the rod 8 by bolts 9 or other attaching means, the other end of the rod 8 being provided with a crank 10 having the handle 11. The rod 8 serves to expand or contract the diameter of the core 6, whose front end is secured against rotation by the pin 12, mounted through the walls of said core 6 as shown in Fig. 2 and driven into the supporting ground to anchor it.

Along the line 4—4 the sheet forming the core 6 is wound upon itself as shown in Fig. 4, its outer thickness carrying fixed therein the locking rivets 13, its inner thickness having apertures to receive the inwardly projecting ends of said rivets when the core is at the desired diameter to do its work, so that said rivets will seat through said apertures as shown in Fig. 4 and lock the core 6. The head 14 is a guide employed in adjusting the core 6 to the desired diameter, having finger-holes 15 to admit of its being readily installed or removed, and a recess 16 to accommodate the rod 8, and other recesses 17 about its periphery to accommodate the inner ends of the rivets 13. When said rivets 13 are seated in place as shown in Fig. 4 the head 14 is no longer needed, and is withdrawn before the concrete or like plastic material is flowed and set about the core 6. The material being flowed and set, the crank 10, which has been held during that operation by the looped link 18 (secured to the eye 19 in the head of the pin 12 as shown in Figs. 1 and 2) is released and turned to compress the core 6 to smaller diameter than the cavity it has formed in the plastic structure, in which compressed condition said core is withdrawn from the work and is in condition to be again set at proper diameter for re-use.

The described parts may be altered in construction without departing from my invention, which broadly consists in the several combinations of the appended claims.

Claims.

1. The method of molding plastic structures consisting in placing a spirally wound resilient tubular body for use as a core; in applying power to the terminals of said core to expand or contract the same to the desired diameter for molding; in holding said core in expanded or contracted condition while flowing the plastic material about the same; and in releasing the terminals of said body for the purpose of collapsing said body and permitting its withdrawal from the plastic mass.

2. In an apparatus for molding plastic structures, in combination with an outer form and spaced therefrom by a coiled annular spacing member a spirally wound inner core whose normal diameter is smaller or larger than that of the cavity to be molded; and means for expanding or contracting said core for use as a mold, and relaxing said core for purposes of withdrawal from the set plastic structure.

3. In an apparatus for molding plastic structures, in combination with an outer form and spaced therefrom by a coiled annular spacing member, a spirally wound inner core whose normal diameter is smaller or larger than that of the cavity to be molded; means for expanding or contracting said core for use as a mold; means for holding said core in that expanded or contracted position; and means for relaxing said core for purposes of withdrawal from the set plastic structure.

In testimony whereof I hereunto affix my signature.

GEORGE A. BONELLI.